United States Patent [19]
Dreuw et al.

[11] 3,832,904
[45] Sept. 3, 1974

[54] APPARATUS FOR MONITORING AND TAKING GAS SAMPLES IN SHAFT FURNACES

[75] Inventors: Heinz Dreuw, Mulheim/Ruhr; Hans-Jürgen Mischke, Essen, both of Germany; Franz Lippeck, deceased, late of Essen-Borbeck, Germany by Irmgard Lippeck, heir; Gitia Bohnenkamp, Essen; Marion Lippeck, heirs, Homberg, both of Germany

[73] Assignee: Fried Krupp Gesellschaft mit beschrankter Haftung Altendorfer Strasse, Essen, Germany

[22] Filed: Mar. 14, 1973

[21] Appl. No.: 341,173

[30] Foreign Application Priority Data
Mar. 15, 1972 Germany.............................. 2212396

[52] U.S. Cl.............................................. 73/421.5 A
[51] Int. Cl. ............................................. G01n 1/22
[58] Field of Search.... 73/421.5 R, 421.5 A, 423 R; 137/315, 317

[56] References Cited
UNITED STATES PATENTS
3,240,069   3/1966   Kennedy....................... 73/421.5 A
3,589,388   6/1971   Haneline............................ 137/315

*Primary Examiner*—S. Clement Swisher
*Attorney, Agent, or Firm*—Spencer & Kaye

[57] ABSTRACT

Apparatus for automatically taking measurements and samples of gas during the operation of shaft-type furnaces, the apparatus including a gastight housing sealingly connected to the wall of a furnace and carrying within it a horizontally-disposed probe mounted for reciprocal movement through the wall and means to move the probe reciprocally. The measurements and samples are withdrawn from the housing through a sealed passage. The movement of the probe is controlled by a drive device disposed outside the housing and communicating with the probe mount through sealed passages in the housing.

6 Claims, 4 Drawing Figures

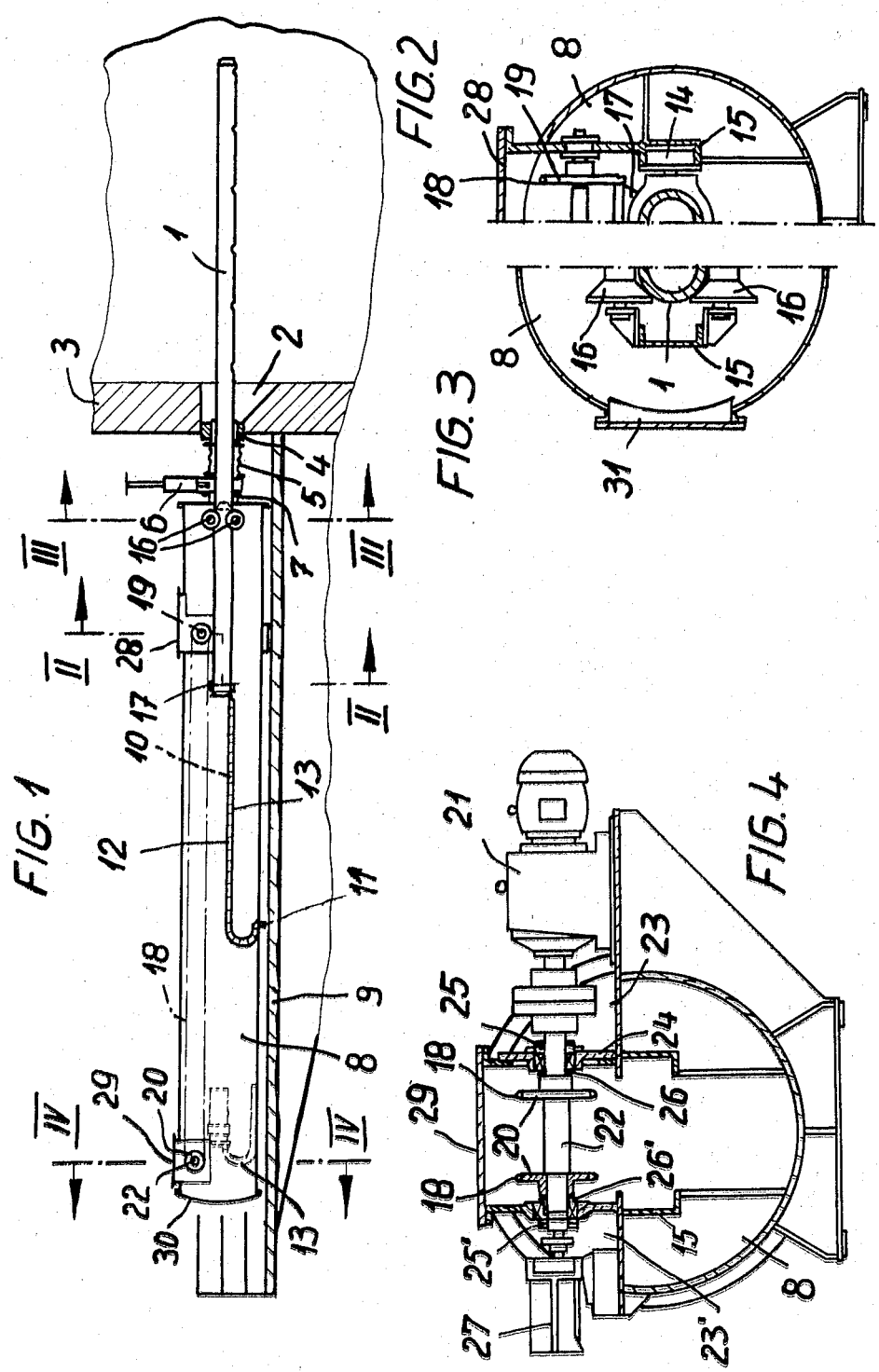

3,832,904

APPARATUS FOR MONITORING AND TAKING GAS SAMPLES IN SHAFT FURNACES

BACKGROUND OF THE INVENTION

The present invention relates to apparatus for monitoring and taking gas samples from shaft-type furnaces, particularly blast furnaces. The invention particularly relates to a gas monitoring probe which is horizontally inserted into the shaft of a blast furnace.

Known testing probes of this type are normally passed or inserted into the opening in the jacket or wall of the furnace shaft through a stuffing box and a vertically movable slide, or gate-valve-type, device is sealingly connected to the opening. The stuffing box is flanged to the outer side of the slide device so that the opening is normally sealed against gas emission when the slide is open, e.g. raised. The slide is closed when the stuffing box packing becomes worn to the extent that it no longer provides a seal and must be replaced. The slide may also be closed or lowered when the probe is not in use.

German Published Pat. applications (DAS) Nos. 1,408,098 and 1,533,829 disclose some of the currently used devices to insert and withdraw probes. In the apparatus of the last mentioned Published Patent Application the probe is provided at its outer end with two bilaterally disposed guide rollers which are displaceably mounted within a guide frame. The probe is moved along the guide frame by a hydraulic cylinder which is arranged in parallel with the probe and which engages the probe near its outer end.

The drawback of the known devices for use in the monitoring and taking of gas samples in shaft-type furnaces is mainly that the stuffing box packings are under extreme stress from heat and pressure when the probe is inserted and removed and during the intervening measuring period, when the probe is usually also moved around within the shaft. As a result, the packings have a very short lifetime. In order not to have to replace the stuffing box packings too frequently, individual measurements are taken only at long intervals, for example every eight hours. However, these intervals are too long to meet the requirements of modern operating methods for blast furnaces or other shaft-type furnaces, which are designed to operate the furnaces as completely automatically as possible.

SUMMARY OF THE INVENTION

It is an object of the present invention to overcome the above-described drawbacks of the known state of the art and to provide an apparatus of the above-mentioned type which is capable, without any major expenditures, of automatically taking measurements and samples at relatively short intervals. This is accomplished in that a gastight housing is provided which accommodates the probe and the means to move the probe and to transmit the measurements and samples, and the housing is provided with an opening via which it is to be sealably connected with the jacket opening.

The novel apparatus has no parts which are subject to rapid wear so that it is able to operate for long periods of time with little or no maintenance and also permits measurements to be automatically taken at any interval as desired. The apparatus can also be easily attached to any existing conventional shaft-type furnace or can be shifted from one furnace to another or serve as a replacement for an existing unit of the previously known type.

It is particularly advantageous for the means transmitting reciprocal motion to the probe to be accommodated within the housing. In this way any otherwise required seal for a longitudinally displaceable part is avoided.

It is furthermore advantageous that, as an additional aspect of the present invention, the flexible lines for transmitting the measuring pulses and gas samples which are connected to the part of the probe facing away from the furnace are brought through the housing wall in a sealing manner, the passage of the lines through the wall being disposed approximately in the center of the path traversed by the end of the probe to which the lines are connected. In this case there are no moving parts which need to be sealed off separately.

BRIEF DESCRIPTION OF THE DRAWINGS

FIG. 1 is a side elevational view, partially in section, showing one embodiment of the present invention installed on a jacket or outer wall of a furnace.

FIG. 2 is a partial sectional view along the lines II—II of FIG. 1 showing the right hand side of the apparatus and the support for, and movement means for, the probe.

FIG. 3 is a partial sectional view along lines III—III of FIG. 1 showing the left hand side of the apparatus and the additional support for the probe.

FIG. 4 is a view, partially in section, along the lines IV—IV of FIG. 1 showing the means for moving the probe.

FIGS. 2, 3 and 4 are to a larger scale than FIG. 1.

DESCRIPTION OF THE PREFERRED EMBODIMENTS

FIG. 1 shows a probe 1 in its measuring position where it is inserted through the opening 2 in the jacket or wall of a shaft-type furnace 3, only a small portion of the jacket being shown. A connecting sleeve 4 is sealably inserted into opening 2. A laterally extending, flexible lateral position compensator 5 with interior sealing rings is connected on one end to the connecting sleeve 4. A device 6 having a vertically movable slide is connected to the lateral compensator 5 to close or block off the compensator when the opening 2 is to be shut off. A substantially cylindrical gastight housing 8 fastened to a platform 9 on the jacket of the furnace is connected to the blocking device 6 by way of connecting opening 7. The compensator 5 assures a tight connection between the opening 2 and housing 8 even when, due to the influence of heat, the connecting sleeve 4 shifts in a radial or axial direction.

The end of the probe 1 facing away from the furnace, which end is shown in FIG. 1 by dot-dash lines in the position where the probe is removed from the furnace, is connected to flexible lines 10 for the transmission or further conduction of the measuring pulses emitted by the probe, for example, for temperature measurements and gas samples to indicator or analyzer devices. The lines are brought sealingly through the wall of the housing 8 on the side facing the furnace platform 9 approximately in the center of the path travelled by that end of the probe. This may be effected for example in a simple manner by a conventional sealing paste or in a more sophisticated manner by a coupling for lines 10. Lines 10 are supported by so-called cable moving device 12 which includes at its side 13, which is the underside of the portion primarily supported by the probe ends, members which are jointedly connected together and form a support for lines 10 as the probe is moved reciprocally along its axis.

As shown in FIG. 2, the probe 1 is provided with two diametrically positioned rollers 14 at its end facing away from furnace 3, which rollers engage two guide rails 15 disposed along both sides of the probe within housing 8. As shown in FIG. 3, a pair of spool-shaped guide rollers 16 is vertically mounted near opening 7 and between the guide rails 15 to prevent radial displacement of the probe 1.

In the region where rollers 14 are mounted on probe 1, two endless chains 18 are connected with the probe 1 via a connector 17 and are supported by the wheels of two pairs of chain wheels 19 and 20, each pair being mounted in the vicinity of a respective end of housing 8. The pair of chain wheels 20 which is positioned oppositely connecting opening 7 is driven by a bidirectional motor 21 disposed outside of housing 8 at the end away from the furnace. Means to actuate the motor for desired time intervals are well known and need not be described in detail.

As can be seen in FIG. 4, the drive shaft 22 of motor 21 passes through a wall of a recess 23 in housing 8 and is there mounted in a flange 24. Conventional seals, for example a radial sealing ring 25 and a resilient cover plate 26, are used so that the shaft passage is gastight. A corresponding recess 23' is provided at the oppositely disposed side of housing 8 where a lead screw limit switch 27 is connected to shaft 22 by a clutch. Switch 27 indicates the end positions of probe 1. The mounting and sealing of the passage of the drive shaft 22 to the clutch and the lead screw limit switch 27 is achieved by suitable radial sealing ring 25' and resilient cover plate 26'.

For purposes of repair or maintenance, closable openings 28, 29, 30 and 31 are provided in the areas of the various bearing points of the drive system. If such work is to be performed, the valve member 6, which otherwise always remains open, is closed before such work commences.

In the area of the connecting opening 7, a certain degree of play is provided between the opening 7, the blocking member 6, the lateral compensator 5 and the connecting sleeve 4 for the probe 1, so that the probe 1 will still be able to pass through the opening and can be pulled out of furnace 3 even if it should have been bent by the influence of heat.

During operation of the device a practically stagnant column of furnace gas exists in the housing 8. Thus no significant amount of furnace dust will reach the interior of the housing and cleaning becomes necessary only after longer periods of operation.

The operation of the apparatus of the present invention is not impeded by the slight quantity of dust which deposits in the vicinity of the connecting opening 7 on the underside of housing 8. The apparatus can also be used with particular advantage for high pressure blast furnaces.

It will be understood that the above description of the present invention is susceptible to various modifications, changes and adaptations, and the same are intended to be comprehended within the meaning and range of equivalents of the appended claims.

We claim:

1. In apparatus for monitoring and taking gas samples in a shaft-type furnace having a jacket, the apparatus including a horizontally displaceable measuring probe arranged to be introduced into the furnace through an opening in its jacket, the improvement comprising:

a. a gastight housing in which said probe is disposed and provided with a connecting opening, said housing having a cylindrical form and said probe being mounted to extend substantially along the axis of said housing, said housing being connected with said jacket opening so that said housing opening is in sealing communication with said jacket opening;

b. guide rollers mounted on said probe;

c. two guide rails, each supported by said housing and disposed to a respective side of said probe, said guide rails extending along the axis of said housing and each of said guide rollers engaging in, and moving along, a respective one of said guide rails; and d. a pair of further guide rollers rotatably mounted on said housing and engaging said probe, said further guide rollers serving to limit movement of said probe transverse to the direction of its horizontal displacement.

2. An arrangement as defined in claim 1 further comprising force transmitting means disposed within said housing and connected to said probe for driving said probe into and out of the furnace.

3. An arrangement as defined in claim 1 further comprising flexible lines connected to said probe, at the end thereof which faces away from the furnace, for conducting measurement signals and gas samples away from the probe, said housing being provided with an opening through which said lines pass in a sealing manner.

4. An arrangement as defined in claim 3 further comprising a cable moving device mounted to support and guide said lines, and wherein said opening in said housing for the passage of said lines is disposed approximately at the midpoint of the path traveled by the end of said probe to which said lines are connected.

5. An arrangement as defined in claim 1 further comprising a valve member mounted between said jacket opening and said connecting opening of said housing for selectively closing the passage therebetween.

6. An arrangement as defined in claim 1 further comprising a flexible lateral position compensator connected between said jacket opening and said connecting opening of said housing for providing a flexible passage therebetween.

* * * * *